April 1, 1952  J. M. DEJOY  2,591,522
GROUND LEVELING ATTACHMENT FOR TRACTOR CULTIVATORS
Filed Aug. 2, 1948 2 SHEETS—SHEET 1
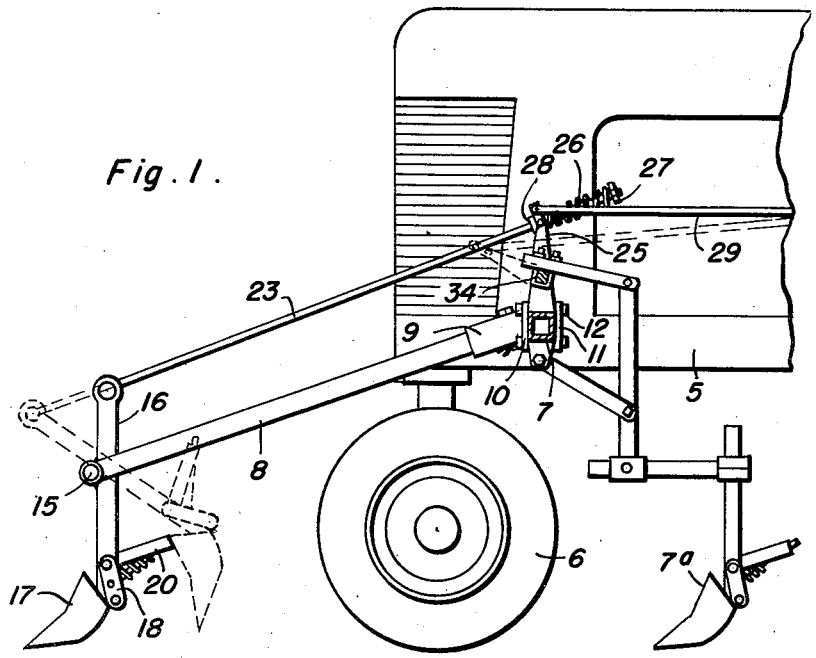
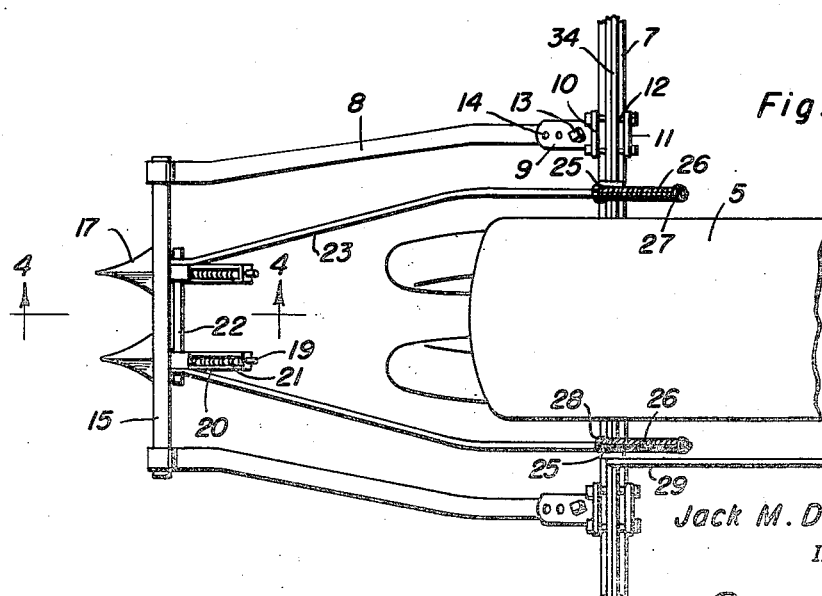
Jack M. Dejoy
INVENTOR.

April 1, 1952 J. M. DEJOY 2,591,522
GROUND LEVELING ATTACHMENT FOR TRACTOR CULTIVATORS
Filed Aug. 2, 1948 2 SHEETS—SHEET 2

Jack M. Dejoy
INVENTOR.

BY *Clarence A. O'Brien*
*and Harvey B. Jacobson*
Attorneys

UNITED STATES PATENT OFFICE 2,591,522

GROUND LEVELING ATTACHMENT FOR TRACTOR CULTIVATORS

Jack M. Dejoy, Paynesville, Minn.

Application August 2, 1948, Serial No. 42,078

1 Claim. (Cl. 37—181)

The present invention relates to new and useful improvements in attachments for tractor cultivators to level the ground in advance of the forward wheels of the tractor, particularly when the machine is cross cultivating, thereby preventing the continuous jolting which would be imparted to the machine in traveling across alternate ridges and trenches formed by a previous cultivating operation.

An important object of the invention is to provide an improved ground leveling attachment for tractor cultivators embodying the provision of a plow supported for vertical swinging movement in advance of each wheel of a tractor together with means operated by the driver of the tractor for raising and lowering the plows to place the plows in ground leveling position or to raise the plows when not required for use.

A still further object is to provide an attachment of this character which may be easily and quickly attached in position to a tractor without necessitating any changes or alterations in the construction thereof and which at the same time is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of the front end of a farm tractor showing the ground leveling attachment in position thereon and with parts broken away and shown in section;

Figure 2 is a top plan view;

Figure 3:
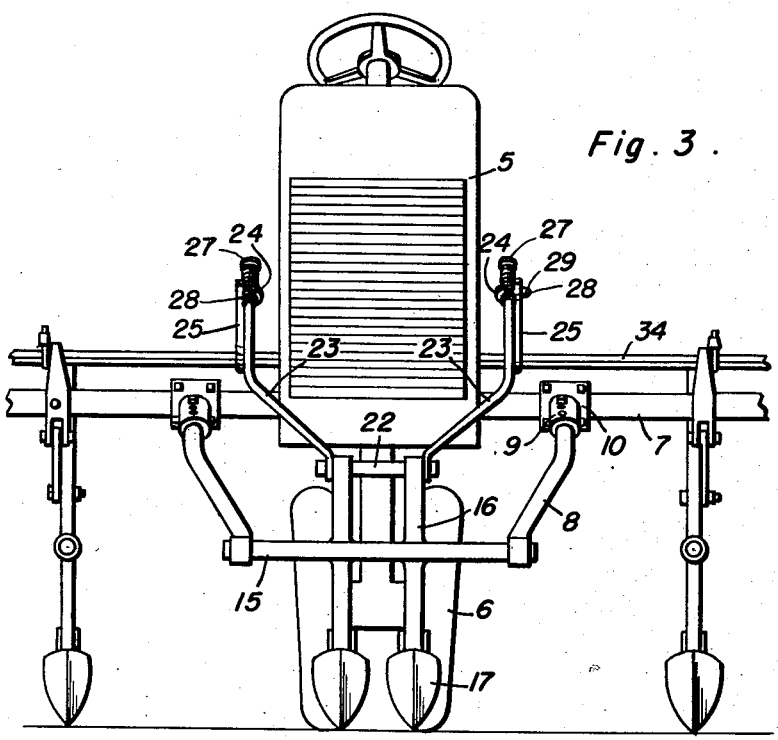
Figure 3 is a front elevational view.
Figure 4:
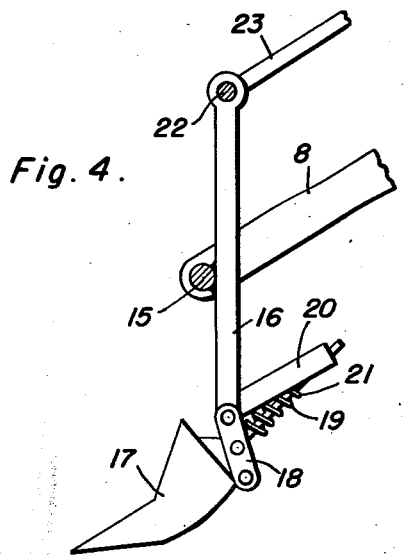
Figure 4 is a transverse sectional view taken substantially on a line 4—4 of Figure 2.

Referring now to the drawings in detail wherein for the purpose of illustration I have disclosed a preferred embodiment of the invention, the numeral 5 designates a conventional type of farm tractor having front wheels 6 and an implement supporting bar 7 projecting horizontally outwardly from each side of the front end of the tractor and to which the usual cultivating plows or shovels 7a are attached.

A pair of arms 8 are supported in a downwardly inclined position forwardly of the bars 7 by means of a socket 9 carried by one part 10 of a sectional clamping device attached to the bars 7 and including a rear plate 11 secured to the part 10 by bolts or the like 12.

The rear ends of arms 8 are adjustably secured in sockets 9 by means of a pin 13 extending transversely through the socket and through the rear end of the arms and selectively engage in a row of openings 14 in the socket.

A shaft 15 is journaled in a horizontal transversely extending position in the front ends of arms 8 and to which vertical shanks 16 are welded or otherwise suitably secured.

A ground leveling plow or shovel 17 is pivotally connected to the lower end of each of the shanks 16 by means of links 18 having the front end of a rod 19 pivoted thereto and slidably supported at its rear end in a bracket 20 projecting rearwardly in an upwardly inclined position from the lower end of shanks 16. A coil spring 21 positioned on rod 19 holds the plow 17 in a forwardly projected position and is yieldable when striking large stones or other objects to swing the plow 17 rearwardly to prevent injury thereto.

A cross bar 22 connects the upper ends of shanks 16 and to which the front ends of lift rods 23 are pivotally attached.

The lift rods 23 have their rear ends slidably supported in guides 24 at the upper ends of arms 25 carried by a tool bar 34 rockably supported above bars 7 and coil springs 26 are positioned on the rods 23 behind the guides 24 and exert their pressure against washers 27 fixed to the rods to urge the rods rearwardly and hold the shanks 16 upright with the plows 17 in their lower ground leveling position. Stop washers 28 are fixed to rods 23 in front of guides 24.

A power operated lift rod 29 extends rearwardly from one of the arms 25 to rock tool bar 34 to simultaneously raise cultivators 7a and plows 17, when not in use.

In the operation of the device, the arms 8 are secured in position to the bars 7 to support the plows 17 in front of the front wheels 6 of the tractor, the springs 26 holding the shanks 16 and plows 17 in their ground leveling position as shown by the full lines in Figure 1.

When it is desired to raise the plows out of operating position, the lever 29 is pushed forwardly which swings arm 25 and guides 24 forwardly to thus raise plows 17 into the position shown by the dotted lines in Figure 1.

Figure 5:
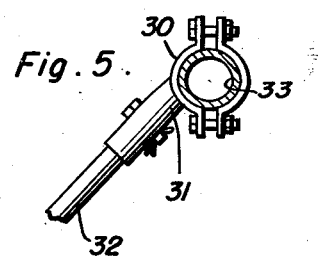
Figure 5 illustrates a modified clamping attachment or round-type implement supporting bars.

Figure 5 illustrates a split clamp 30 for attaching socket 31 of arm 32 to a round cultivator tool supporting bar 33.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having thus described the invention, what is claimed as new is:

In a tractor having front wheels, and a transverse fixed front bar extending from opposite sides of said tractor, a pair of laterally spaced arms fixed to said bar at opposite sides of the tractor and inclining downwardly and forwardly of said wheels, a pair of laterally spaced vertical shanks between said arms forwardly of said wheels, ground leveling tools on the lower ends of said shanks in front of said wheels, respectively, a rock shaft rigidly supporting said shanks intermediate the ends thereof and journaled in said arms whereby said shanks are vertically swingable to swing said tools rearwardly and upwardly out of ground leveling position, and means to swing said arms comprising a crank arm pivotally mounted to said front bar for forward swinging, a crossbar connecting the upper ends of said shanks, a push rod connected to said crossbar and having a collar thereon engaged by said crank arm to thrust said rod forwardly, a guide on said crank arm slidably supporting the push rod, and spring means on the rod coacting with said guide to urge the rod rearwardly and yieldingly oppose swinging of said tools out of ground engaging position, and means to swing said crank arm.

JACK M. DEJOY.

REFERENCES CITED

The following references are of record in the file of this patent:

UNITED STATES PATENTS

| Number | Name | Date |
|---|---|---|
| 2,131,872 | Galpin | Oct. 4, 1938 |
| 2,218,948 | Cooper | Oct. 22, 1940 |
| 2,277,880 | Noble | Mar. 31, 1942 |
| 2,282,367 | Koistinen | May 12, 1942 |
| 2,505,280 | Ellinghuysen | Apr. 25, 1950 |